(12) United States Patent
Miyakoshi

(10) Patent No.: US 8,433,503 B2
(45) Date of Patent: Apr. 30, 2013

(54) DRIVING ASSISTANCE DEVICE

(75) Inventor: Tsuneo Miyakoshi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/144,437

(22) PCT Filed: Feb. 24, 2009

(86) PCT No.: PCT/JP2009/053288
§ 371 (c)(1),
(2), (4) Date: Jul. 13, 2011

(87) PCT Pub. No.: WO2010/097892
PCT Pub. Date: Sep. 2, 2010

(65) Prior Publication Data
US 2011/0276258 A1  Nov. 10, 2011

(51) Int. Cl.
*G06F 19/00* (2011.01)
(52) U.S. Cl.
USPC .......................................... 701/117; 348/119
(58) Field of Classification Search .................. 701/117, 701/70; 348/118, 119; 340/471
See application file for complete search history.

(56) References Cited

U.S. PATENT DOCUMENTS

2008/0221767 A1   9/2008   Ikeda et al.

FOREIGN PATENT DOCUMENTS

| DE | 10334203 A1 | 3/2005 |
|---|---|---|
| EP | 1919752 A1 | 5/2008 |
| JP | 2003-288694 A | 10/2003 |
| JP | 2006-185137 * | 7/2006 |
| JP | 2007-62651 A | 3/2007 |
| JP | 2008-59074 A | 3/2008 |
| JP | 2008-097279 * | 4/2008 |
| JP | 2008-97279 A | 4/2008 |
| JP | 2008-129816 A | 6/2008 |
| JP | 2008-129817 A | 6/2008 |
| JP | 2008-129818 A | 6/2008 |
| WO | 2008/062721 A1 | 5/2008 |

OTHER PUBLICATIONS

International Search Report dated Oct. 27, 2011 issued in a corresponding a PCT Applicaition No. PCT/JP2009/053288.
Office Action dated Dec. 18, 2012 in corresponding German Patent Application No. 112009004419.0.

* cited by examiner

*Primary Examiner* — Thomas Black
*Assistant Examiner* — Luke Huynh
(74) *Attorney, Agent, or Firm* — Sughrue Mion, PLLC

(57) ABSTRACT

A driving assistance device which performs driving assistance for an assisted vehicle A traveling on a non-priority road 40 and trying to merge into a priority road 50 on the basis of the presence of a vehicle B traveling on the priority road 50 includes an assistance processing section 16 which changes the end position of driving assistance on the basis of traffic conditions on a first lane 51, which is nearest to the non-priority road 40, of lanes of the priority road 50. Accordingly, it is possible to perform appropriate driving assistance for a driver.

2 Claims, 8 Drawing Sheets

Fig.6
(a)
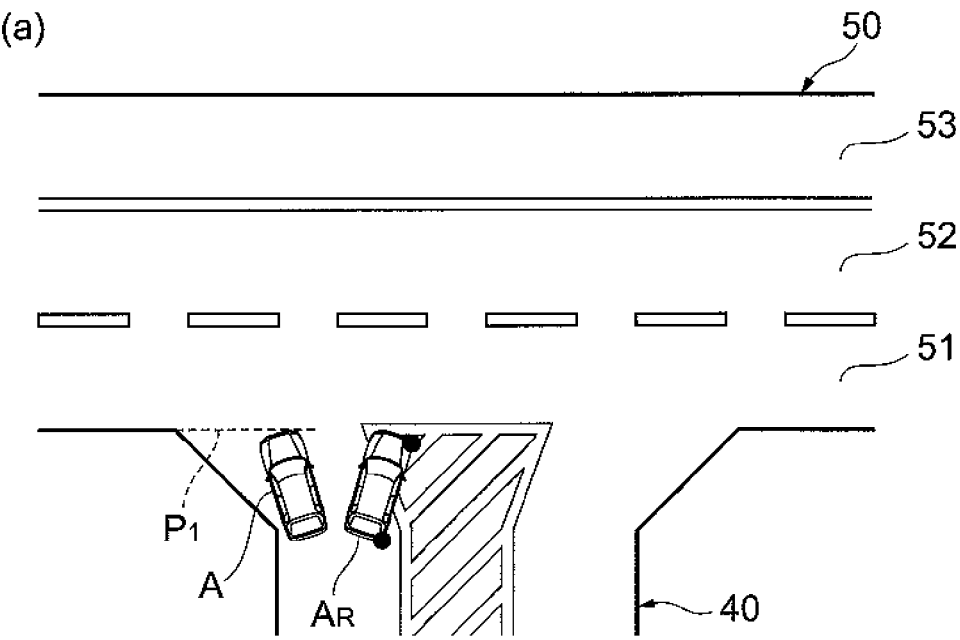
(b)
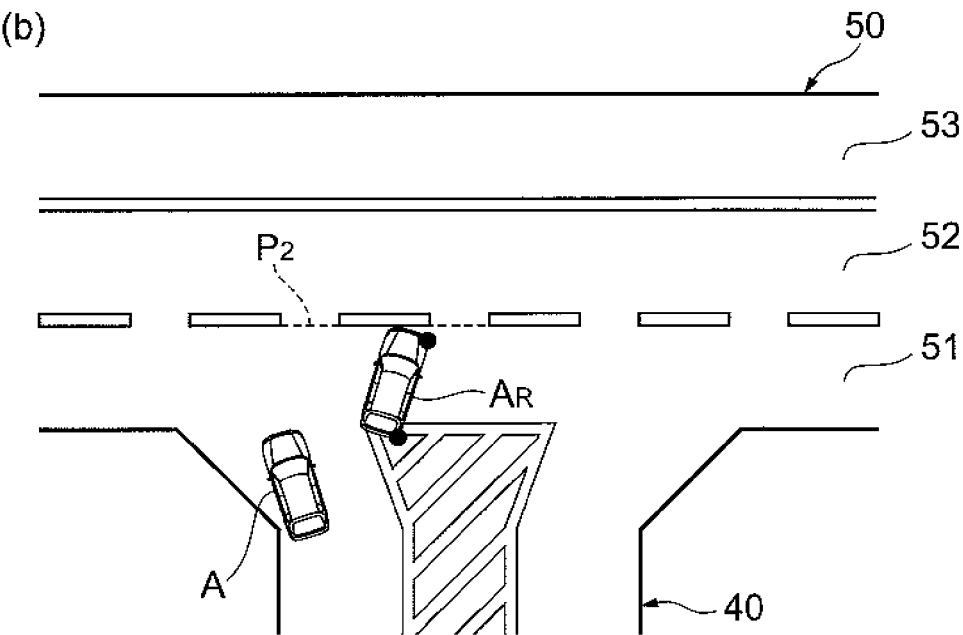

DRIVING ASSISTANCE DEVICE

CROSS REFERENCE TO RELATED APPLICATIONS

This application is a National Stage of International Application No. PCT/JP2009/053288 filed on Feb. 24, 2009, the contents of all of which are incorporated herein by reference in their entirety.

TECHNICAL FIELD

The present invention relates to a device which assists driving.

BACKGROUND ART

Conventionally, a driving assistance device for preventing head-on collisions is known. For example, a device disclosed in Patent Literature 1 acquires the information regarding the presence of a vehicle traveling on the priority road or the presence of a pedestrian on the sidewalk through a roadside infrastructure apparatus and executes driving assistance for providing the acquired information to a vehicle on the non-priority road. This device executes driving assistance for a vehicle when the vehicle is present in a service section and ends the driving assistance after the vehicle passes the service section.

Patent Literature 1: Japanese Unexamined Patent Application Publication No. 2003-288694

SUMMARY OF INVENTION

Technical Problem

In the conventional driving assistance device, however, driving assistance required for a driver may not be performed. For example, if driving assistance ends on the boundary of a non-priority road and a priority road or a stop line, there is a possibility that the driving assistance may be ended without providing the information required for a driver of a vehicle on the non-priority road under the circumstances where there is a street parking vehicle on the priority road.

Therefore, the present invention has been made to solve such a technical problem, and it is an object of the present invention to provide a driving assistance device capable of performing driving assistance for provision of appropriate information according to the traffic conditions on the priority road.

Solution to Problem

That is, a driving assistance device related to the present invention is a driving assistance device which performs driving assistance for an assisted vehicle traveling on a non-priority road and trying to merge into a priority road on the basis of the presence of a vehicle traveling on the priority road, and is characterized in that it includes an assistance end position changing section which changes the end position of the driving assistance on the basis of traffic conditions on a first lane, which is nearest to the non-priority road, of lanes of the priority road.

According to the present invention, when performing driving assistance for an assisted vehicle trying to merge into the priority road on the basis of the presence of a vehicle traveling on the priority road, the assistance end position changing section can change the end position of driving assistance (assistance end timing) on the basis of traffic conditions on the first lane, which is nearest to the non-priority road, of lanes of the priority road. Since the end position of driving assistance is changed on the basis of the traffic conditions on the first lane of the priority road, it becomes possible to change the assistance timing until the driver of the assisted vehicle moves to a position where the safety can be visually confirmed, for example. For this reason, it is possible to end the driving assistance after providing the information required for the driver. Accordingly, driving assistance for appropriate information service can be performed.

Here, the assistance end position changing section may change the end position on the basis of traffic conditions in which a stopped vehicle is present in the first lane or traffic conditions in which a vehicle traveling in the first lane is to stop.

Through this configuration, in the case of traffic conditions where a stopped vehicle or a vehicle trying to stop is present in the first lane of the priority road, the assistance end position changing section changes the end position of driving assistance on the basis of the traffic conditions. The traffic conditions where a stopped vehicle or a vehicle trying to stop is present in the first lane of the priority road may be regarded as conditions where it is difficult for the driver of the assisted vehicle to check a vehicle behind on the priority road which is traveling to a junction. Accordingly, assistance required for the driver can be continued, for example, by changing the assistance end position until the driver of the assisted vehicle moves to the position where the driver can see a vehicle traveling on the priority road.

In addition, the assistance end position changing section may change the end position on the basis of traffic conditions on the first lane in left and right directions when viewed from the assisted vehicle before merging. Through this configuration, appropriate driving assistance can be performed for the driver of the assisted vehicle.

In addition, when the assisted vehicle tries to merge into the priority road to travel in the same direction as the traffic flow of the first lane, the assistance end position changing section may change the end position on the basis of the presence of a vehicle which tries to merge into the priority road from the non-priority road in order to travel in the opposite direction to the traffic flow of the first lane.

Through this configuration, when the assisted vehicle tries to merge into the priority road by turning left, for example, on the road of left-hand traffic, the end position of driving assistance can be changed on the basis of the presence of a right-turn vehicle trying to merge into the priority road by turning right. Accordingly, appropriate driving assistance can be performed.

ADVANTAGEOUS EFFECTS OF INVENTION

According to the present invention, it is possible to perform driving assistance for provision of appropriate information according to the traffic conditions on the priority road.

BRIEF DESCRIPTION OF DRAWINGS

FIG. 6 is a schematic view illustrating the operation of the driving assistance device related to the third embodiment.

REFERENCE SIGNS LIST

Figure 1:
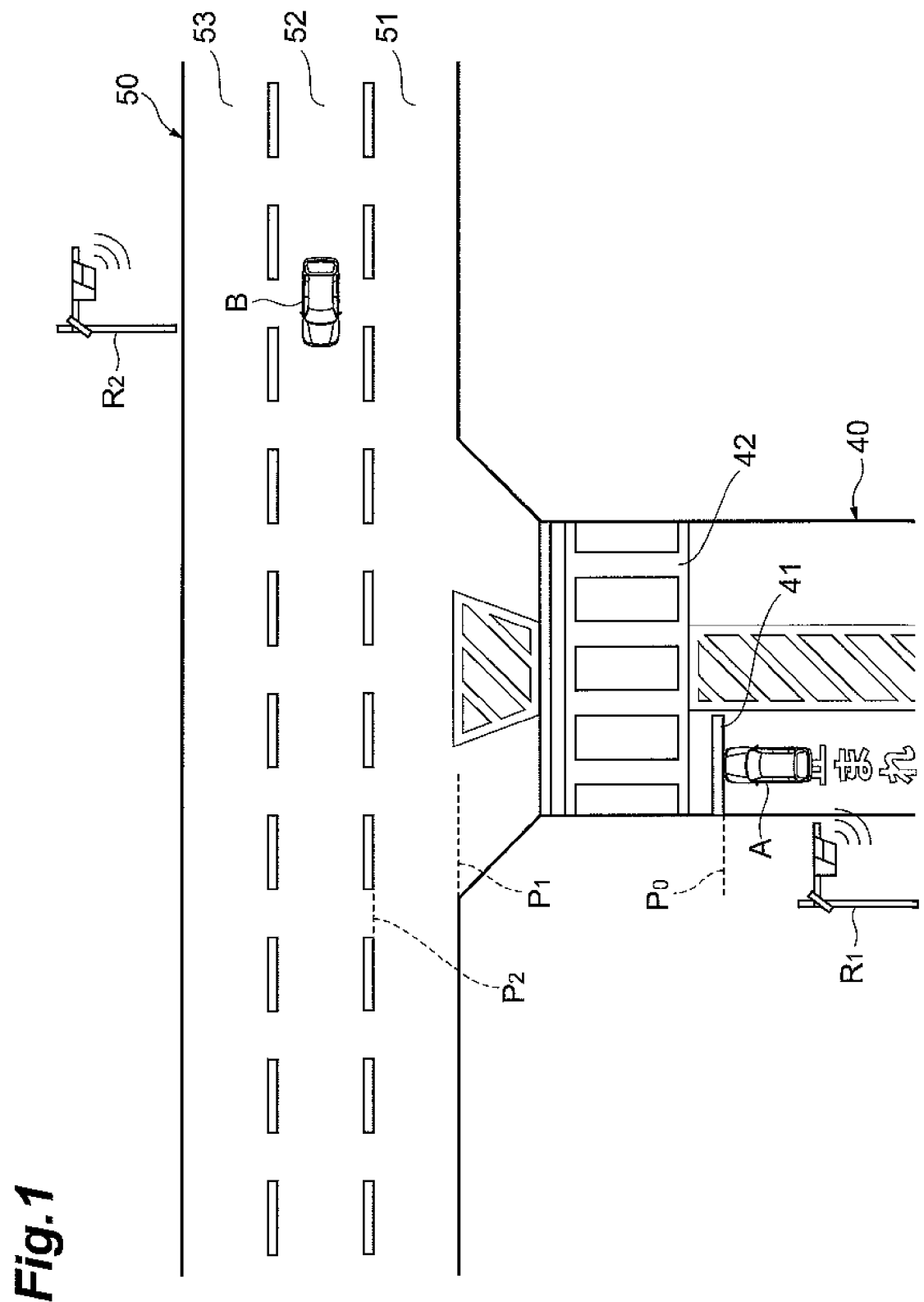
FIG. 1 is a schematic view illustrating an assistance scene in which a driving assistance device related to a first embodiment gives assistance.

1: DRIVING ASSISTANCE DEVICE
10: ECU
11: HOST VEHICLE POSITION INPUT SECTION
12: ROAD LINE SHAPE INFORMATION INPUT SECTION
13: TRAVELING VEHICLE INFORMATION INPUT SECTION
14: PARKED VEHICLE INFORMATION INPUT SECTION
15: ASSISTANCE NECESSITY DETERMINING SECTION
16: ASSISTANCE PROCESSING SECTION (ASSISTANCE END POSITION CHANGING SECTION)

Description Of Embodiments

Hereinafter, embodiments of the present invention will be described with reference to the accompanying drawings. Moreover, in each drawing, the same or corresponding sections are denoted by the same reference numerals and repeated explanation thereof will be omitted. In addition, all explanations will be given using a road of left-hand traffic unless otherwise stated.

(First Embodiment)

A driving assistance device related to the present embodiment is a device which assists driving of a vehicle and is appropriately adopted for driving assistance when a vehicle merges into the priority road, for example.

First, an assistance scene in which the driving assistance device related to the present embodiment gives assistance will be described. FIG. 1 is an example of the assistance scene in which driving assistance of the driving assistance device related to the present embodiment is performed. In the assistance scene shown in FIG. 1, a priority road 50 of left-hand traffic and a non-priority road 40 which merges with the priority road 50 are present. The priority road 50 is a road which is given priority in traffic over the non-priority road 40. This priority road 50 includes a plurality of lanes 51 to 53, for example. Moreover, on the non-priority road 40, a halt road sign 41 is provided at the point $P_0$ before merging with the priority road 50 in order to give priority to the traffic of the priority road 50. The driving assistance device related to the present embodiment performs driving assistance for merging, for a vehicle A which is traveling on the non-priority road 40 and is going to merge into the priority road 50, on the basis of the presence of a vehicle B traveling on the priority road 50. In addition, the case where the driving assistance device related to the present embodiment is provided in the vehicle A will be described below as an example.

Figure 2:
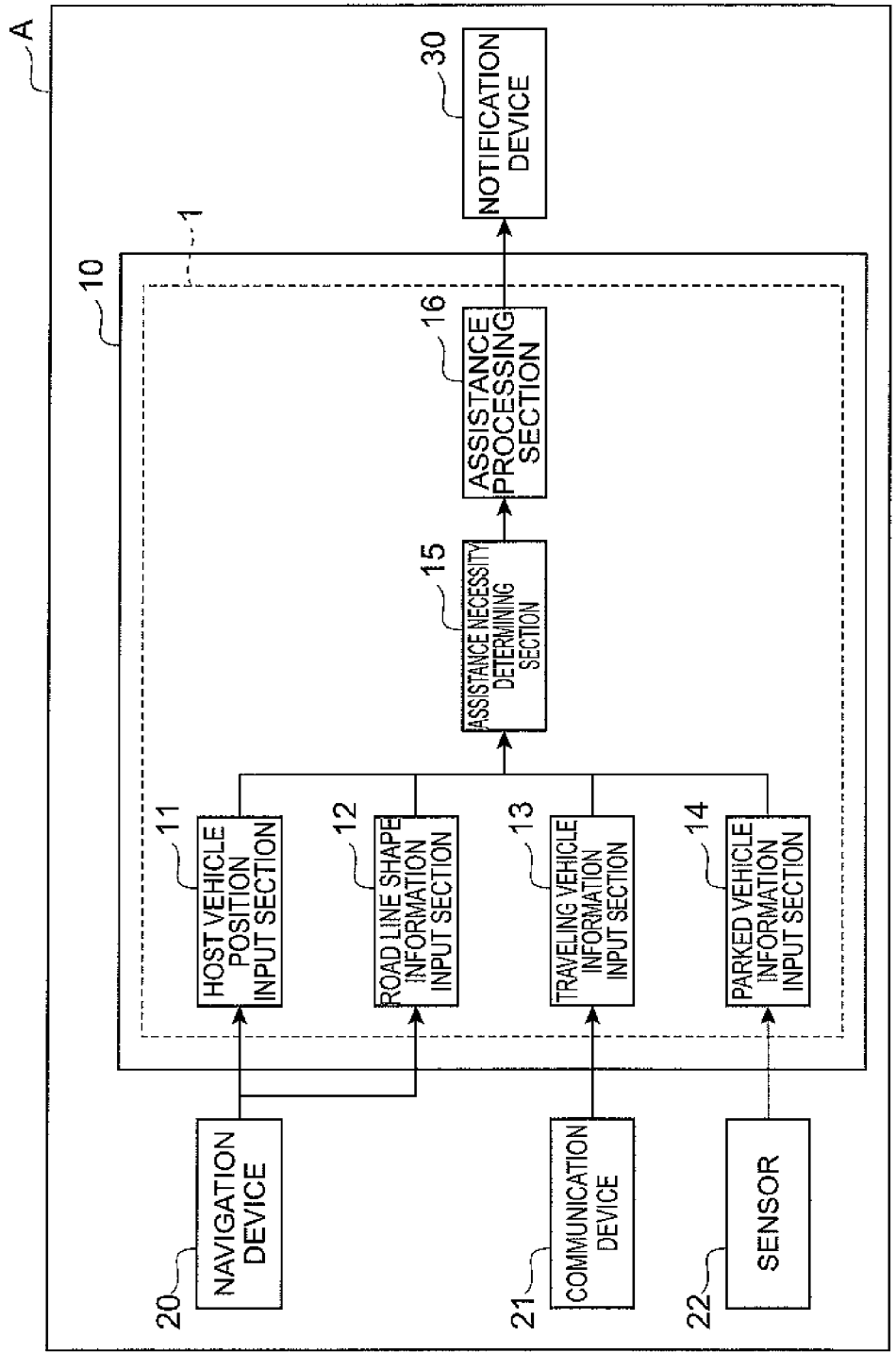
FIG. 2 is a block diagram of a vehicle including the driving assistance device related to the first embodiment.

FIG. 2 shows the configuration of a vehicle A in which a driving assistance device 1 related to the present embodiment is mounted. As shown in FIG. 2, the vehicle A includes a navigation device 20, a communication device 21, a sensor 22, an ECU (Electronic Control Unit) 10, and a notification device 30. Here, the ECU is a computer of an automobile device which performs electronic control and is configured to include a CPU (Central Processing Unit), a memory such as a ROM (Read Only Memory) or a RAM (Random Access Memory), an input/output interface, and the like.

The navigation device 20 includes a GPS (Global Positioning System) receiver, for example, and has a function of acquiring the positional information of the vehicle A. In addition, the navigation device 20 is configured to be able to refer to the map information DB in which, for example, map information including road line shape or altitude, facility information, and the like are stored and has a function of acquiring the road line shape information around the vehicle A. For example, the road line shape information includes a connection angle at the intersection or the number of lanes of a road intersected or connected. In addition, the navigation device 20 has a function of outputting the acquired information to the ECU 10.

The communication device 21 is configured to be able to perform vehicle-to-vehicle communication or road-to-vehicle communication and has a function of acquiring the information regarding vehicles present around the vehicle A. For example, the communication device 21 is configured to be able to receive the information regarding the vehicle B traveling on the priority road 50. For example, the communication device 21 has a function of receiving the presence of the traveling vehicle B and the traveling conditions of the vehicle B through vehicle-to-vehicle communication with the vehicle B. Here, the traveling conditions are speed, acceleration, traveling position, and the like, for example. Alternatively, for example, as shown in FIG. 1, when a roadside assistance device $R_n$ (n: integer) is provided on the priority road 50 and the non-priority road 40 and a roadside assistance device $R_2$ provided on the priority road 50 is configured to be able to detect the vehicle B and transmit the presence of the vehicle B and the traveling conditions of the vehicle B to a roadside assistance device $R_1$, the communication device 21 may be configured to be able to receive the presence of the vehicle B and the traveling conditions of the vehicle B from the roadside assistance device $R_1$. The communication device 21 has a function of outputting the presence of the vehicle B and the traveling conditions of the vehicle B, which have been received, to the ECU 10.

The sensor 22 is configured to be able to detect an object on the side of the vehicle A. For example, a front camera capable of imaging the side of the vehicle A, a side radar which transmits an electromagnetic wave to the side of the vehicle A and receives it, and the like are used as the sensor 22. The sensor 22 has a function of outputting the detected result to the ECU 10.

The ECU 10 includes a host vehicle position input section 11, a road line shape information input section 12, a traveling vehicle information input section 13, a parked vehicle information input section 14, an assistance necessity determining section 15, and an assistance processing section (assistance end position changing section) 16. In addition, the driving assistance section (driving assistance device) 1 is configured to include the host vehicle position input section 11, the road line shape information input section 12, the traveling vehicle information input section 13, the parked vehicle information input section 14, the assistance necessity determining section 15, and the assistance processing section 16.

The host vehicle position input section 11 has a function of receiving the positional information of the vehicle A. For example, the host vehicle position input section 11 is configured to be able to receive the positional information of the vehicle A which is output from the navigation device 20. In addition, the host vehicle position input section 11 has a function of outputting the input positional information of the vehicle A to the assistance necessity determining section 15.

The road line shape information input section 12 has a function of receiving the road line shape information around the vehicle A. For example, the road line shape information input section 12 is configured to be able to receive the road line shape information which is output from the navigation device 20. In addition, the road line shape information input section 12 has a function of outputting the input road line shape information to the assistance necessity determining section 15.

The traveling vehicle information input section 13 has a function of receiving the information regarding the presence of the vehicle B traveling on the priority road 50 and the traveling conditions of the vehicle B. For example, the traveling vehicle information input section 13 is configured to be able to receive the information regarding the presence of the vehicle B and the traveling conditions of the vehicle B, which is output from the communication device 21. In addition, the traveling vehicle information input section 13 has a function of outputting to the assistance necessity determining section 15 the input information regarding the presence of the vehicle B and the traveling conditions of the vehicle B.

The parked vehicle information input section 14 has a function of acquiring the traffic conditions on the priority road 50. For example, the parked vehicle information input section 14 has a function of receiving the information regarding a vehicle parked on the priority road 50. For example, the parked vehicle information input section 14 has a function of acquiring whether or not there is a vehicle parked in the first lane 51 nearest to the non-priority road 40, among the lanes 51 to 53 of the priority road 50, on the basis of a signal output from the sensor 22. Here, the parked vehicle information input section 14 has a function of regarding the vehicle as a parked vehicle on the basis of the detection result of the sensor 22, for example, when the detected speed of the vehicle is equal to or smaller than a threshold value V1 or the detected distance to the intersection of the vehicle is equal to or smaller than a threshold value L1. As the threshold value V1, for example, 20 km/h is used. That is, not only a vehicle which is in a complete stop state but also a vehicle which may be regarded as a parked vehicle is included in the "parked vehicle" used below. In addition, the parked vehicle information input section 14 has a function of outputting the information regarding a parked vehicle to the assistance necessity determining section 15.

The assistance necessity determining section 15 has a function of determining whether or not driving assistance for the vehicle A is necessary. For example, the assistance necessity determining section 15 has a function of determining whether or not driving assistance is necessary on the basis of the positional information of the vehicle A output from the host vehicle position input section 11 and the road line shape information output from the road line shape information input section 12. In addition, the assistance necessity determining section 15 may have a function of determining whether or not driving assistance is necessary in consideration of the information regarding the presence of the vehicle B and the traveling conditions of the vehicle B output from the traveling vehicle information input section 13 and the information regarding a parked vehicle output from the parked vehicle information input section 14. In addition, the assistance necessity determining section 15 has a function of outputting to the assistance processing section 16 the input information and the determination result regarding whether or not driving assistance is necessary.

The assistance processing section 16 has a function of determining a driving assistance section for the vehicle A and making the notification device 30 execute driving assistance. For example, the assistance processing section 16 has a function of changing a driving assistance section on the basis of the information regarding a parked vehicle in the first lane 51 which is output from the parked vehicle information input section 14. Specifically, the assistance processing section 16 has a function of changing the end position of driving assistance (end timing of assistance). For example, the assistance processing section 16 has a function of changing the end position of driving assistance so as to become a driving assistance section, which is longer than the normal driving assistance section, when a parked vehicle is present in the first lane 51. In addition, the assistance processing section 16 has a function of outputting a control signal to the notification device 30 so that the notification device 30 executes driving assistance, which is required for merging into the priority road 50, in the determined driving assistance section.

The notification device 30 has a function of performing driving assistance by notification to the driver of the vehicle A on the basis of the control signal from the assistance processing section 16. For example, a display, a speaker, and the like are used as the notification device 30.

Figure 3:
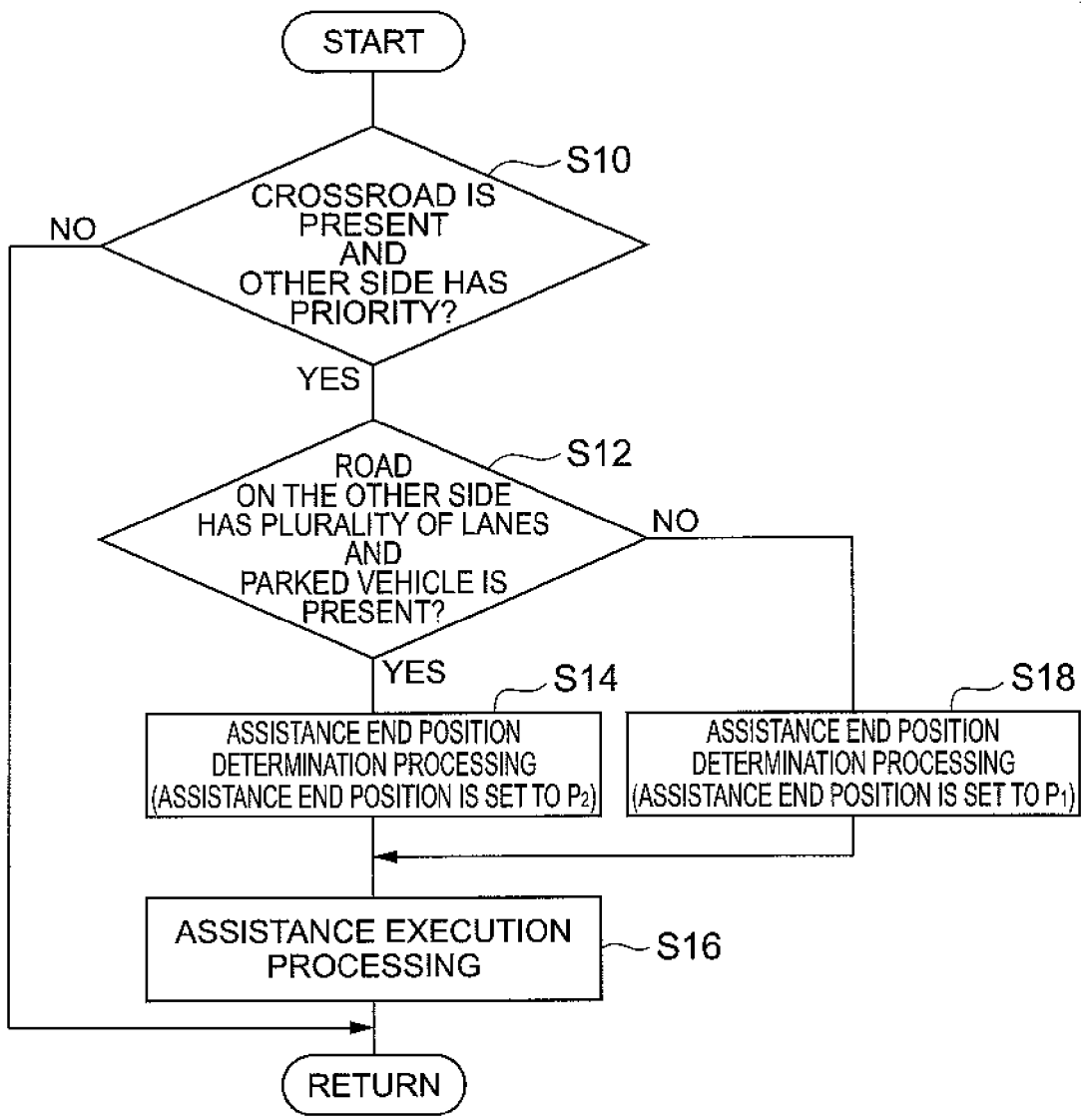
FIG. 3 is a flow chart showing an operation of the driving assistance device related to the first embodiment.
Figure 4:
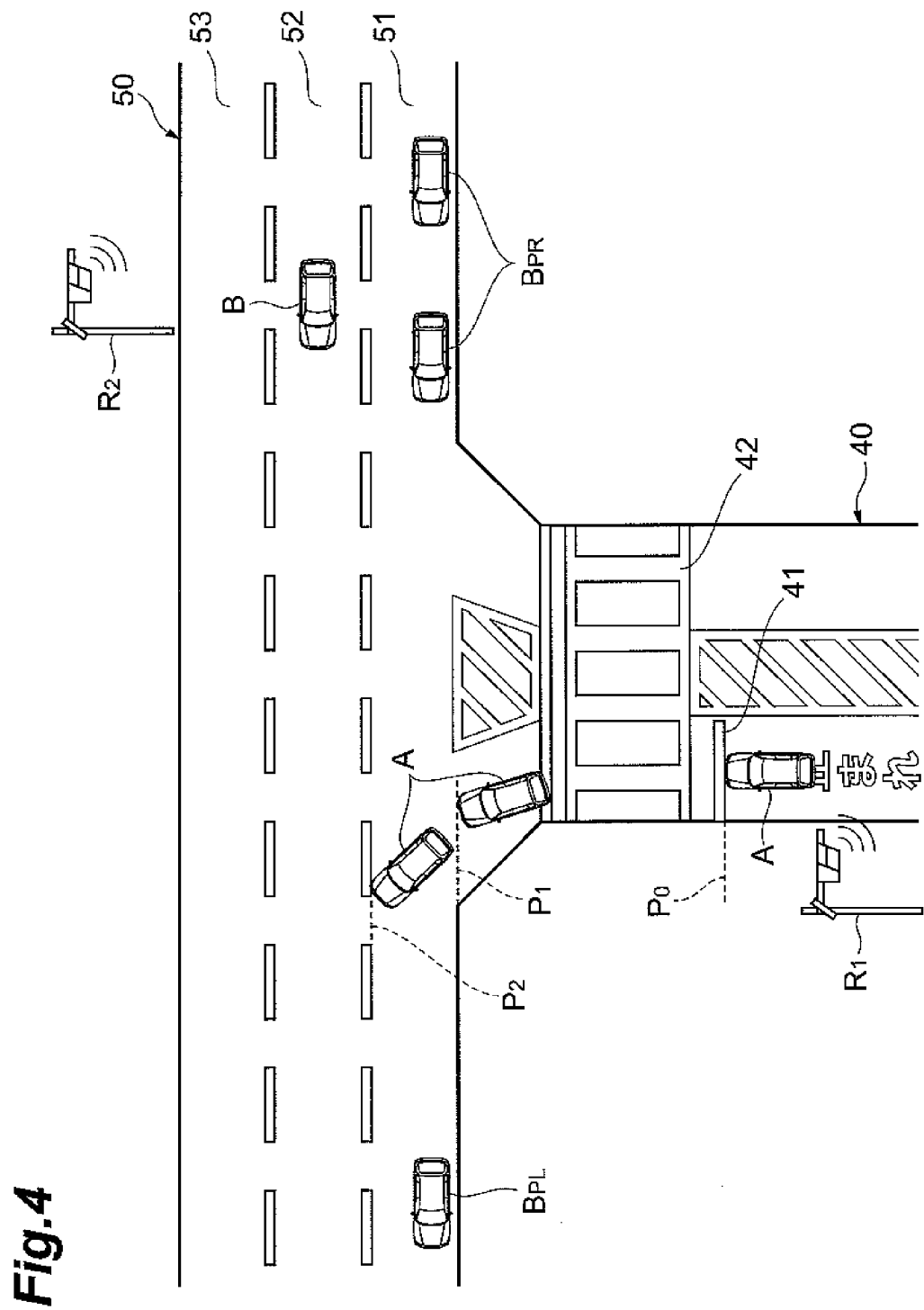
FIG. 4 is a schematic view illustrating the operation of the driving assistance device related to the first embodiment.

Next, an operation of the driving assistance device 1 related to the present embodiment will be described. FIG. 3 is a flow chart showing an operation of the driving assistance device 1 related to the present embodiment. The control process shown in FIG. 3 is repeatedly executed at predetermined intervals from a timing of ignition ON, for example. In addition, in consideration of the ease of understanding the explanation, the operation of the driving assistance device 1 will be described using the assistance scene shown in FIG. 4. FIG. 4 is a schematic view illustrating the operation of the driving assistance device 1 related to a first embodiment, and the same sections as in FIG. 1 are denoted by the same reference numerals. In FIG. 4, the vehicle B is a traveling vehicle and vehicles $B_{PL}$ and $B_{PR}$ are parked vehicles. In addition, an example will be described in which a driving assistance device mounted in the vehicle A performs driving assistance for the vehicle A when the vehicle A merges into the priority road 50 by turning left.

As shown in FIG. 3, the driving assistance device 1 is executed from assistance necessity determination processing (S10). The processing of S10 is executed by assistance necessity determining section 15, and is processing for determining whether or not driving assistance is necessary. The assistance necessity determining section 15 determines whether or not driving assistance is necessary on the basis of the positional information of the vehicle A output from the host vehicle position input section 11 and the road line shape information output from the road line shape information input section 12. For example, when there is a crossroad in the traveling direction of the vehicle A and the crossroad on the other side is a priority road on the basis of the current position of the vehicle A and the road line shape information, the assistance necessity determining section 15 determines that driving assistance is necessary. For example, when the vehicle A is traveling on the non-priority road 40 as shown in FIG. 4, the assistance necessity determining section 15 determines that driving assistance is necessary because the priority road 50 intersected with the non-priority road 40 exists in the traveling direction of the vehicle A. When the assistance necessity determining section 15 determines that driving assistance is necessary in the processing of S10, the process proceeds to traffic condition determination processing (S12).

The processing of S12 is executed by the assistance processing section 16, and is processing for determining the traffic conditions on the priority road 50 in order to determine a driving assistance section. The assistance processing section 16 determines whether or not the priority road 50 has a plurality of lanes on the basis of the road line shape information output from the road line shape information input section 12, for example. In addition, the assistance processing section 16 determines whether or not there is a parked vehicle in the first lane 51 on the basis of the information regarding a parked vehicle in the first lane 51 output from the parked vehicle information input section 14. For example, in the case of the assistance scene shown in FIG. 4, the assistance processing section 16 determines that the priority road 50 has a plurality of lanes because the priority road 50 has three lanes and also determines that there is a parked vehicle because the parked vehicles $B_{PL}$ and $B_{PR}$ are present in the first lane 51. When the assistance processing section 16 determines that the priority road 50 has a plurality of lanes and the parked vehicles $B_{PL}$ and $B_{PR}$ are present in the first lane 51 in the processing of S12, the process proceeds to assistance end position determination processing (S14).

The processing of S14 is executed by the assistance processing section 16, and is processing for determining a driving assistance section. For example, as shown in FIG. 4, the section of driving assistance which is normally performed by the assistance processing section 16 is assumed to be a section from an assistance start point $P_0$ of the halt road sign 41 to the point $P_1$ entering the priority road 50. In this case, the assistance processing section 16 changes the end position of the driving assistance section so as to become a longer driving assistance section than the normal driving assistance section. For example, the end position of the driving assistance section is changed to the point $P_2$ passing the first lane 51. After the processing of S14 ends, the process proceeds to assistance execution processing (S16).

On the other hand, when the assistance processing section 16 determines that the priority road 50 does not have a plurality of lanes or the parked vehicles $B_{PL}$ and $B_{PR}$ are not present in the first lane 51 in the processing of S12, the process proceeds to normal assistance end position determination processing (S18). The processing of S18 is executed by the assistance processing section 16, and is processing in which the normal assistance section is set as a driving assistance section. For example, as shown in FIG. 4, the section from the assistance start point $P_0$ of the halt road sign 41 to the point $P_1$ entering the priority road 50 is set as an assistance section. After the processing of S18 ends, the process proceeds to assistance execution processing (S16).

The processing of S16 is executed by the assistance processing section 16, and is processing in which driving assistance is performed in the driving assistance section set in the processing of S14 or S18. For example, the assistance processing section 16 operates the notification device 30 so that the driver is notified of the presence or traveling conditions, merging timing, and the like of the vehicle B traveling on the priority road 50. After the processing of S16 ends, the control process shown in FIG. 3 ends.

As described above, the control process shown in FIG. 3 ends. By executing the control process shown in FIG. 3, the end position of driving assistance is changed to the point $P_2$ passing the first lane 51 and the driving assistance is executed up to the position, at which the driver of the vehicle A can visually check the vehicle B, when the vehicles $B_{PL}$ and $B_{PR}$ parked in the first lane 51 of the priority road 50 into which the vehicle A is going to merge are present. Accordingly, it is possible to provide the information required for the driver appropriately.

As described above, according to the driving assistance device 1 related to the first embodiment, when performing driving assistance to the assisted vehicle A trying to merge into the priority road 50 on the basis of the presence of the vehicle B traveling on the priority road 50, the assistance processing section 16 can change the end position of the driving assistance from the point $P_1$, which is the end position at the time of normal assistance, further to the point $P_2$ after entering the priority road on the basis of the presence of the parked vehicles $B_{PL}$ and $B_{PR}$ in the first lane 51 nearest to the non-priority road 40 side among the lanes 51 to 53 of the priority road 50. Since the end position of driving assistance is changed on the basis of the presence of the parked vehicles $B_{PL}$ and $B_{PR}$ in the first lane 51 of the priority road 50, it is possible to change the assistance timing until the driver of the vehicle A moves to the position where the vehicle B traveling on the priority road 50 can be visually checked without a blind area of the parked vehicles $B_{PL}$ and $B_{PR}$, for example. For this reason, it is possible to end the driving assistance after providing the information required for the driver. Accordingly, appropriate driving assistance can be performed.

(Second Embodiment)

A driving assistance device (driving assistance section) related to a second embodiment is configured similarly to the driving assistance device 1 related to the first embodiment, and is different from the driving assistance device 1 related to the first embodiment in a point that it has a function of changing the end position of driving assistance by analyzing the traffic conditions on the priority road 50 in more detail. Moreover, in the second embodiment, a portion repeated with the first embodiment will not be described and explanation will be focused on the different point.

The vehicle A related to the second embodiment is configured identically to the vehicle A related to the first embodiment. In addition, the assistance processing section 16 of the driving assistance device related to the second embodiment is configured similarly to the assistance processing section 16 of the driving assistance device 1 related to the first embodiment and has a function of changing the end position of driving assistance on the basis of the traffic conditions on the first lane 51 in the left and right directions when viewed from the vehicle A before merging compared with the assistance processing section 16 of the driving assistance device 1 related to the first embodiment. That is, the assistance processing section 16 related to the present embodiment has a function of changing the end position of driving assistance on the basis of the presence of the parked vehicle $B_{PR}$, which is parked in the first lane 51 located in the right direction when viewed from the vehicle A, and the presence of the parked vehicle $B_{PL}$, which is parked in the first lane 51 located in the left direction when viewed from the vehicle A, for example, as shown in FIG. 4. For example, the assistance processing section 16 has a function of changing the end position of driving assistance according to Table 1 given below.

TABLE 1

| * Cases of left turn | Parked vehicle $B_{PR}$ is present in right direction | Parked vehicle $B_{PR}$ is not present in right direction |
| --- | --- | --- |
| Parked vehicle $B_{PL}$ is present in left direction | Assistance end position $P_2$ | Assistance end position $P_1$ |

TABLE 1-continued

| * Cases of left turn | Parked vehicle $B_{PR}$ is present in right direction | Parked vehicle $B_{PR}$ is not present in right direction |
| --- | --- | --- |
| Parked vehicle $B_{PL}$ is not present in left direction | Assistance end position $P_1$ | Assistance end position $P_1$ |

As shown in Table 1, the assistance processing section 16 has a function of changing the end position of driving assistance from the point $P_1$ entering the priority road 50 (end position in normal assistance) to the point $P_2$ passing the first lane 51 only when the parked vehicle $B_{PR}$ is present in the first lane 51 in the right direction when viewed from the vehicle A and the parked vehicle $B_{PL}$ is present in the first lane 51 in the left direction when viewed from the vehicle A. In addition, other functions of the assistance processing section 16 are the same as those of the assistance processing section 16 of the driving assistance device 1 related to the first embodiment.

Next, an operation of the driving assistance device related to the second embodiment will be described. The driving assistance device related to the present embodiment is almost the same as the operation of the driving assistance device related to the first embodiment, and only the determination processing of S12 in FIG. 3 is different. In the processing of S12, the driving assistance device related to the present embodiment proceeds to the processing of S14 in FIG. 3 only when parked vehicles are present in both the left and right directions as shown in Table 1 in addition to the presence of a parked vehicle, and proceeds to the processing of S18 in FIG. 3 in other cases. Other operations are the same as those of the driving assistance device 1 related to the first embodiment.

As described above, according to the driving assistance device related to the second embodiment, the same operations and effects as in the driving assistance device 1 related to the first embodiment are achieved, and the end position of driving assistance is changed on the basis of the presence of the parked vehicles $B_{PL}$ and $B_{PR}$ in the first lane 51 of the priority road 50 located in the left and right directions when viewed from the vehicle A which is an object for assistance before merging. As a result, it is possible to perform precise control compared with the first embodiment. For example, even if a field of view in the right direction is interrupted by the parked vehicle $B_{PR}$, when the vehicle A enters the priority road 50 by turning left, it can be easily understood that the vehicle A can enter the first lane 51 of the priority road 50 without assistance. Accordingly, it becomes possible to avoid disturbing a driver by not changing the assistance end position.

(Third Embodiment)

A driving assistance device (driving assistance section) related to a third embodiment is configured similarly to the driving assistance devices related to the first and second embodiments, and is different from the driving assistance devices related to the first and second embodiments in a point that it has a function of changing the end position of driving assistance in consideration of a vehicle waiting for merging into the priority road 50. Moreover, in the third embodiment, portions that are the same as the first and second embodiments will not be described and explanation will be focused on the different points.

Figure 5:
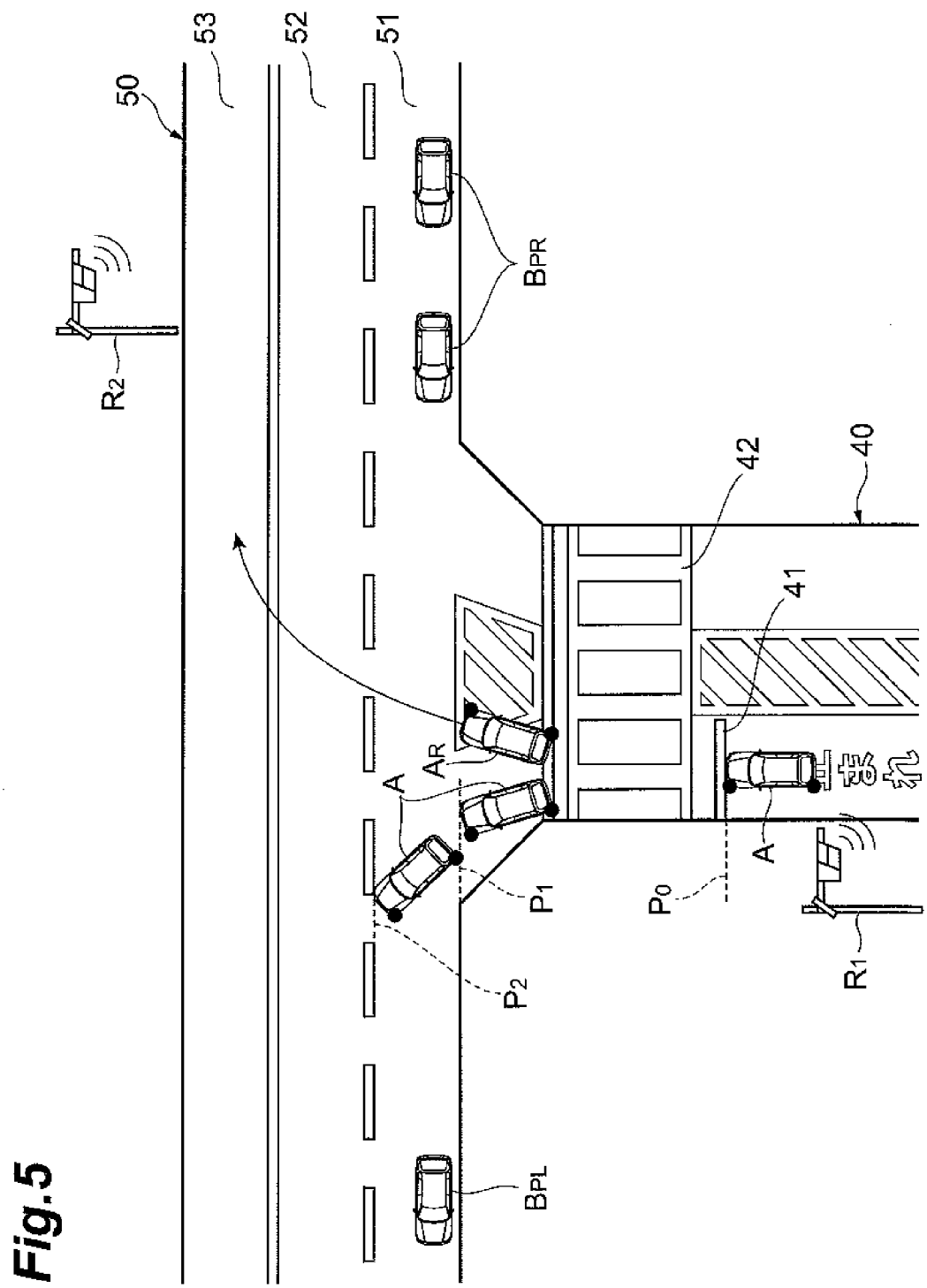
FIG. 5 is a schematic view illustrating an assistance scene in which a driving assistance device related to a third embodiment gives assistance.

The vehicle A related to the third embodiment is configured similar to the vehicle A related to the first embodiment. In addition, the driving assistance device related to the third embodiment is configured similarly to the driving assistance device 1 related to the first embodiment, and is different from the driving assistance device 1 related to the first embodiment in the point that it includes a merging-waiting vehicle input section (not shown). The merging-waiting vehicle input section has a function of receiving the information regarding a vehicle waiting for merging on the non-priority road 40 side. For example, when the vehicle A tries to merge into the priority road 50 in order to travel in the same direction as the traffic flow of the first lane 51, the merging-waiting vehicle input section has a function of receiving the information regarding the presence of a merging-waiting vehicle which tries to merge into the priority road 50 from the non-priority road 40 in the opposite direction to the traffic flow of the first lane 51. Specifically, this will be described using FIG. 5. FIG. 5 is a schematic view illustrating an assistance scene of the driving assistance device related to the third embodiment, and the same sections as in FIGS. 1 and 4 are denoted by the same reference numerals. As shown in FIG. 5, it is assumed that when the vehicle A tries to merge into the priority road 50 by turning left, a vehicle $A_R$ traveling on the non-priority road 40 and trying to merge into the priority road 50 by turning right is present (right turn signal lighting). In this case, the merging-waiting vehicle input section has a function of receiving the presence, speed, acceleration, positional information, and the like of the merging-waiting vehicle $A_R$ from the sensor 22 or the communication device 21 which performs vehicle-to-vehicle communication, for example. In addition, the merging-waiting vehicle input section has a function of outputting the information regarding the merging-waiting vehicle $A_R$ to the assistance necessity determining section 15.

In addition, the assistance processing section 16 of the driving assistance device related to the third embodiment is configured similarly to the assistance processing section 16 of the driving assistance device 1 related to the first embodiment, and has a function of changing the end position of driving assistance on the basis of the information regarding the parked vehicles $B_{PL}$ and $B_{PR}$ on the priority road 50 and the information regarding the merging-waiting vehicle $A_R$ which is input through the assistance necessity determining section 15. For example, in the same manner as the assistance processing section 16 of the first embodiment or the assistance processing section 16 of the second embodiment, the assistance processing section 16 has a function of changing the end position of driving assistance on the basis of the information regarding the parked vehicles $B_{PL}$ and $B_{PR}$ and also changing the end position of driving assistance on the basis of the information regarding the merging-waiting vehicle $A_R$. For example, when the merging-waiting vehicle $A_R$ waits for merging into the priority road 50 without protruding into the priority road 50 as shown in FIG. 6A, the assistance processing section 16 has a function of setting the end position of driving assistance to the point $P_1$ which is the end position of normal driving assistance. For example, when the merging-waiting vehicle $A_R$ protrudes into the priority road 50 to wait for merging into the priority road 50 as shown in FIG. 6B, the assistance processing section 16 has a function of changing the end position of driving assistance to the point $P_2$ passing the first lane 51 so that the driving assistance period becomes longer than the normal driving assistance period. That is, through the same processing as the assistance processing section 16 of the first or second embodiment, the assistance processing section 16 has a function of changing the end position of driving assistance according to the position of the merging-waiting vehicle $A_R$ even if the end position of driving assistance is set to the point $P_1$ which is the end position of the normal driving assistance.

Next, an operation of the driving assistance device related to the third embodiment will be described. The driving assistance device related to the present embodiment is almost the same as the operation of the driving assistance device 1 related to the first embodiment, and only the determination processing of S12 in FIG. 3 is different. The driving assistance device related to the present embodiment determines the conditions, such as whether or not a parked vehicle is present, and determines whether or not the position of the merging-waiting vehicle $A_R$ protrudes into the priority road 50. Moreover, in the processing of S12, when the position of the merging-waiting vehicle $A_R$ protrudes into the priority road 50 even if it is not the case where parked vehicles are present in both the left and right directions, for example, the driving assistance device proceeds to the processing of S14 in FIG. 3. Only when it is not the case where parked vehicles are present in both the left and right directions and the position of the merging-waiting vehicle $A_R$ does not protrude into the priority road 50, the driving assistance device proceeds to the processing of S18 in FIG. 3. Other operations are the same as those of the driving assistance device 1 related to the first embodiment.

As described above, according to the driving assistance device related to the third embodiment, the same operations and effects as in the driving assistance devices related to the first and second embodiments are achieved. In addition, when the assisted vehicle A tries to merge into the priority road 50 by turning left on the road of left-hand traffic, for example, the end position of driving assistance can be changed on the basis of the position of the right-turn vehicle $A_R$ trying to merge into the priority road 50 by turning right. Therefore, it becomes possible to change the assistance end position up to the position $P_2$ where the driver of the vehicle A can see the vehicle B traveling on the priority road 50.

(Fourth Embodiment)

A driving assistance device (driving assistance section) related to a fourth embodiment is configured similarly to the driving assistance devices related to the first to third embodiments, and is different from the driving assistance devices related to the first to third embodiments in the point that it has a function of performing determination regarding street parking on the priority road 50 in more detail. Moreover, in the fourth embodiment, portions that are the same as the first to third embodiments will not be described and explanation will be focused on the different point.

Figure 7:
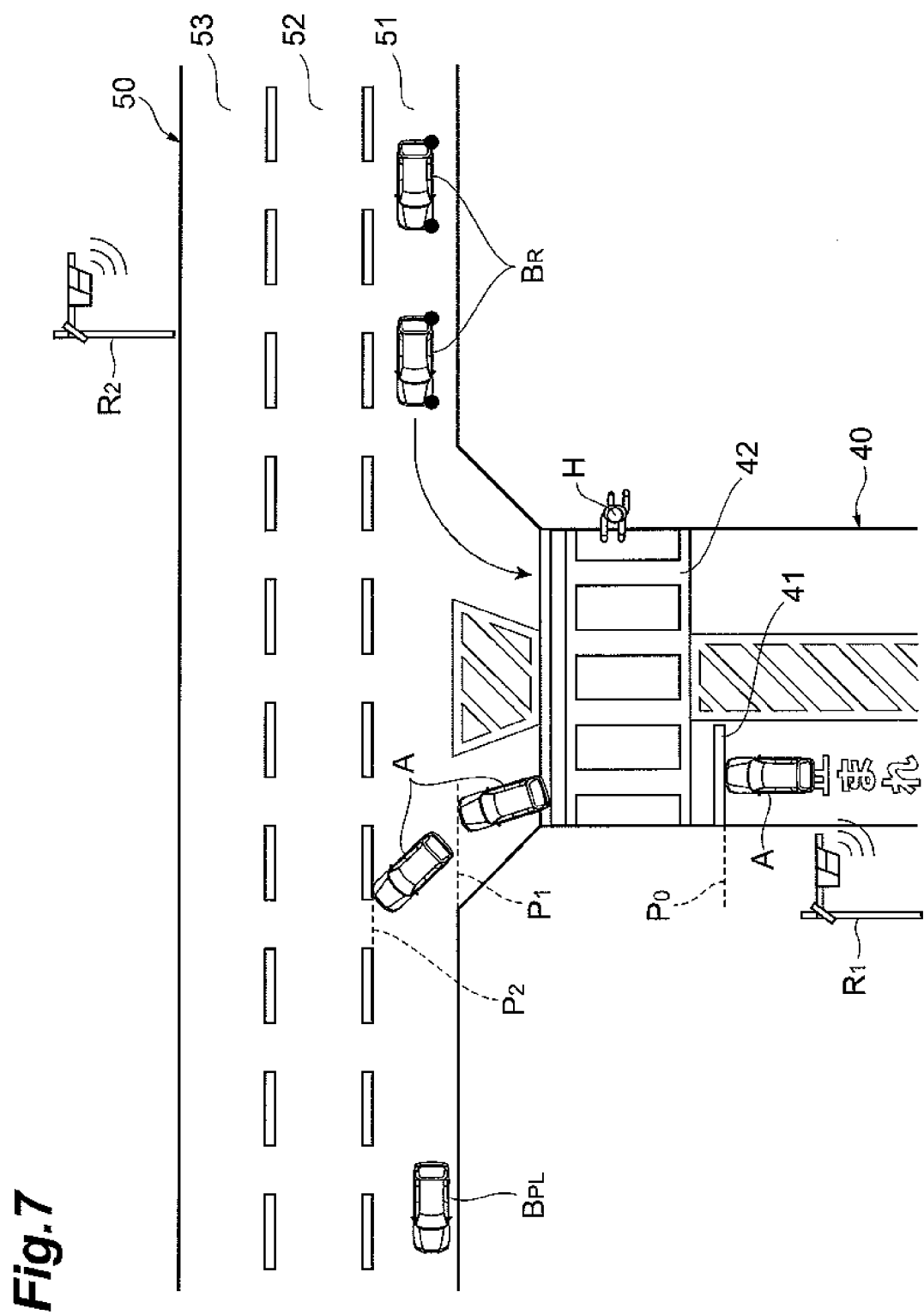
FIG. 7 is a schematic view illustrating an assistance scene in which a driving assistance device related to a fourth embodiment gives assistance.

The vehicle A related to the fourth embodiment is configured similar to the vehicle A related to the first embodiment. In addition, the driving assistance device related to the fourth embodiment is configured similarly to the driving assistance device 1 related to the first embodiment, and the function of the parked vehicle information input section 14 is partially different from that in the driving assistance device 1 related to the first embodiment. The parked vehicle information input section 14 related to the present embodiment has a function of determining whether to regard the vehicle B as a parked vehicle on the basis of a turn signal state of the vehicle B on the priority road 50 or the presence of a pedestrian H, who crosses the road at a crosswalk 42, when the crosswalk 42 exists on the non-priority road 40 as shown in FIG. 7, for example. FIG. 7 is a schematic view illustrating an assistance scene of the driving assistance device related to the fourth embodiment, and the same sections as in FIGS. 1, 4, and 5 are denoted by the same reference numerals. The parked vehicle information input section 14 has a function of receiving, for example, an image captured in a backward direction by an imaging device provided in the vehicle A or the road information that the navigation device 20 has and determining whether or not there is the crosswalk 42 on the non-priority road 40. In addition, the parked vehicle information input section 14 has a function of receiving a turn signal lighting state of a vehicle, which is present in the first lane 51 of the priority road 50, through the sensor 22 or the communication device 21 which performs vehicle-to-vehicle communication and determining whether to regard the vehicle as a parked vehicle on the basis of a lighting time of the turn signal of the vehicle. Other configurations are the same as those of the driving assistance device related to the first embodiment.

Next, an operation of the driving assistance device related to the fourth embodiment will be described. The driving assistance device related to the present embodiment is almost the same as the operation of the driving assistance device related to the first embodiment, and only the determination processing of S12 in FIG. 3 is different. For example, when either or both of the case where the lighting time of the left turn signal of the vehicle is equal to or larger than the threshold value T1 and the case where the pedestrian H is present at the crosswalk 42 are satisfied, the assistance processing section 16 regards the vehicle as a parked vehicle and executes the determination processing of S12 in the same manner as the assistance processing section 16 of the first or second embodiment. In addition, when the speed of the vehicle is equal to or smaller than V1, the assistance processing section 16 may determine whether to regard the vehicle as a parked vehicle by adding the determination conditions where the distance of the vehicle to the intersection is equal to or larger than L1. For example, as shown in FIG. 7, it is assumed that when the vehicle A tries to merge into the priority road 50 by turning left, a vehicle $B_R$ traveling on the priority road 50 and trying to merge into the non-priority road 40 by turning left is present (left turn signal lighting state). It is assumed that the lighting time of the vehicle $B_R$ is equal to or larger than the threshold value T1, the speed of the vehicle $B_R$ is equal to or smaller than V1, and the distance of the vehicle $B_R$ to the intersection is equal to or smaller than L1. In addition, the pedestrian H is assumed to be present at the crosswalk 42. In this case, the parked vehicle information input section 14 regards the vehicle $B_R$ as a parked vehicle and proceeds to the processing of S14 in FIG. 3. Other operations are the same as those of the driving assistance device 1 related to the first embodiment.

As described above, according to the driving assistance device related to the fourth embodiment, the same operations and effects as in the driving assistance devices related to the first to third embodiments are achieved. In addition, when the assisted vehicle A tries to merge into the priority road 50 by turning left on the road of left-hand traffic, for example, it is possible to determine whether to regard the vehicle $B_R$ as a parked vehicle on the basis of the traveling conditions or the turn signal lighting state of the vehicle $B_R$ which tries to merge into the non-priority road 40 by turning left from the priority road 50. In addition, it is possible to determine whether to regard the vehicle $B_R$ as a parked vehicle on the basis of the presence of the pedestrian H who crosses the road at the crosswalk 42. Thus, since slowing down is predicted when turning left from the priority road 50 to the non-priority road 40, appropriate driving assistance can be executed for the vehicle A by regarding the vehicle $B_R$ as a parked vehicle. In addition, when it is assumed that the vehicle $B_R$ waits for crossing of the pedestrian H, appropriate driving assistance can be executed for the vehicle A by regarding the vehicle $B_R$ as a parked vehicle.

(Fifth Embodiment)

A driving assistance device (driving assistance section) related to a fifth embodiment is configured similarly to the driving assistance devices related to the first to fourth embodiments, and is different from the driving assistance devices related to the first to fourth embodiments in a point that it has a function of performing determination regarding street parking on the priority road 50 on the basis of vehicle type and the like. Moreover, in the fifth embodiment, portions which are the same as the first to fourth embodiments will not be described and explanation will be focused on the different point.

Figure 8:
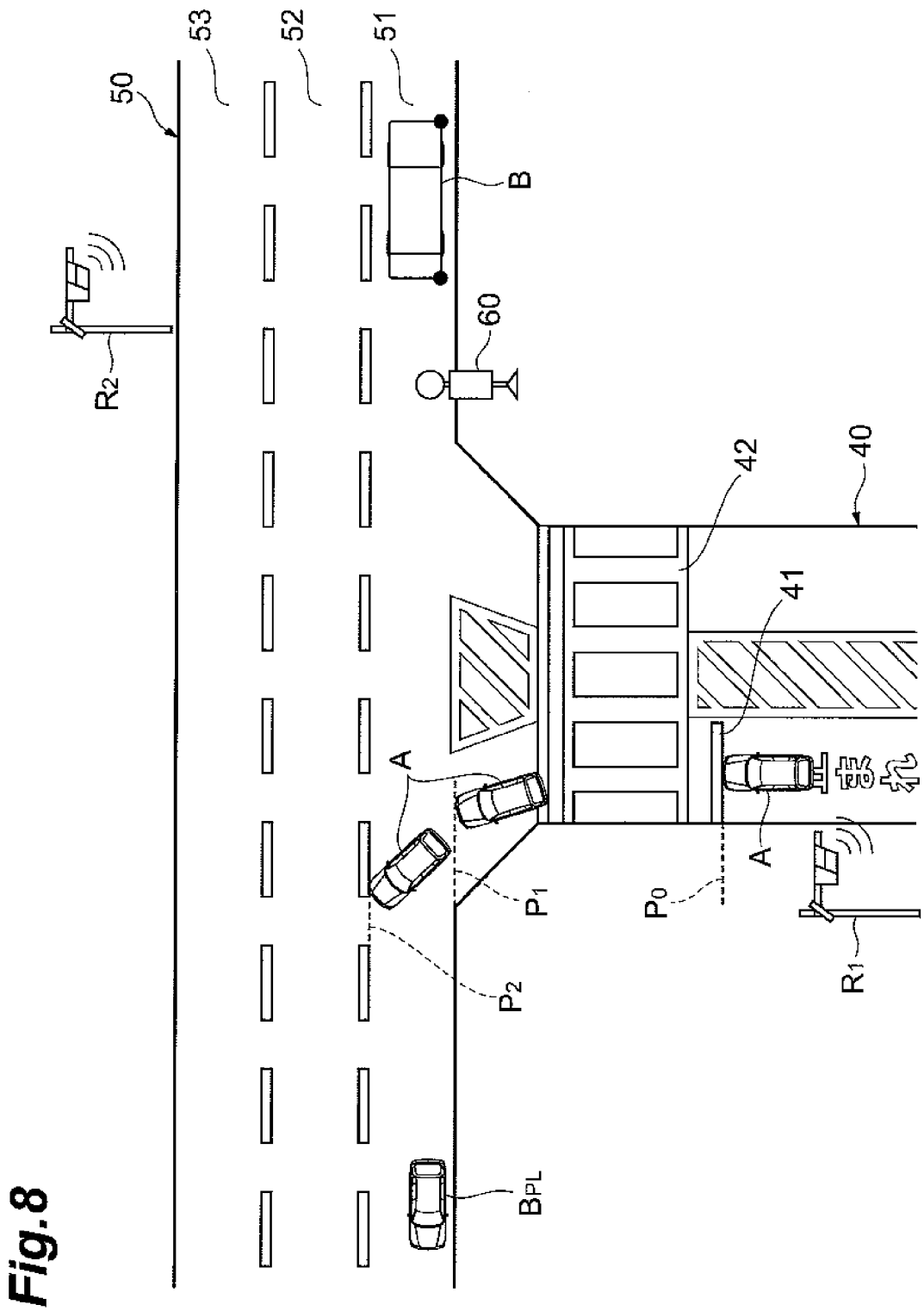
FIG. 8 is a schematic view illustrating an assistance scene in which a driving assistance device related to a fifth embodiment gives assistance.

The vehicle A related to the fifth embodiment is configured similar to the vehicle A related to the first embodiment. In addition, the driving assistance device related to the fifth embodiment is configured similarly to the driving assistance device 1 related to the first embodiment, and the function of the parked vehicle information input section 14 is partially different from that in the driving assistance device 1 related to the first embodiment. The parked vehicle information input section 14 related to the present embodiment has a function of regarding the vehicle B as a parked vehicle if the vehicle type of the vehicle B is determined to be a bus when there is a bus stop 60 before the intersection of the priority road 50, for example, as shown in FIG. 8. FIG. 8 is a schematic view illustrating an assistance scene of the driving assistance device related to the fifth embodiment, and the same sections as in FIGS. 1, 4, 5, and 7 are denoted by the same reference numerals. The parked vehicle information input section 14 has a function of receiving, for example, the detection information of the sensor 22 of the vehicle A or the facility information that the navigation device 20 has and determining whether or not there is the bus stop 60 before the intersection of the priority road 50. In addition, the parked vehicle information input section 14 has a function of determining whether or not the vehicle B is a bus by the sensor 22 or the communication device 21 and regarding the vehicle B as a parked vehicle when the vehicle B is a bus. In addition, the parked vehicle information input section 14 may have a function of determining the vehicle B as a bus on the basis of the combination of a turn signal state, speed, and the like of the vehicle B. Other configurations are the same as those of the driving assistance device related to the first embodiment.

Next, an operation of the driving assistance device related to the fifth embodiment will be described. The driving assistance device related to the present embodiment is almost the same as the operation of the driving assistance device related to the first embodiment, and only the determination processing of S12 in FIG. 3 is different. For example, when both the case where there is the bus stop 60 before the intersection of the priority road 50 and the case where the vehicle type of the vehicle B is a bus are satisfied, the assistance processing section 16 regards the vehicle B as a parked vehicle and executes the determination processing of S12 similar to the assistance processing section 16 of the first or second embodiment. For example, as shown in FIG. 8, it is assumed that when the vehicle A tries to merge into the priority road 50 by turning left, a vehicle B traveling on the priority road 50 is present (left turn signal lighting state). It is assumed that the bus stop 60 is present on the priority road 50 and the traveling vehicle B is a bus. In this case, the parked vehicle information input section 14 regards the vehicle B as a parked vehicle and proceeds to the processing of S14 in FIG. 3. Other operations are the same as those of the driving assistance device 1 related to the first embodiment.

As described above, according to the driving assistance device related to the fifth embodiment, the same operations and effects as in the driving assistance devices related to the first to fourth embodiments are achieved, and it has a function of performing determination regarding street parking on the priority road 50 on the basis of vehicle type and the like. As a result, it is possible to execute appropriate driving assistance for the vehicle A by regarding a vehicle type with high probability of stopping as a parked vehicle.

In addition, each embodiment described above shows an example of the driving assistance device related to the present invention. The driving assistance device related to the present invention is not limited to the driving assistance device related to each embodiment, and the driving assistance device related to each embodiment may be modified or applied to other things without departing from the scope of the present invention as defined in the appended claims.

For example, although the example where the driving assistance device was mounted in a vehicle was described in each of the above embodiments, the driving assistance device may be provided outside a vehicle without being limited to this.

In addition, although the explanation was given using the road of left-hand traffic in each of the above embodiments, it may be right-hand traffic, for example.

In addition, although the example where the parked vehicle information input section 14 received the parked vehicle information detected by the sensor 22 was described in each of the above embodiments, the parked vehicle information may be input from the navigation device 20 or the communication device 21, for example. Moreover, for example, using the past road traffic survey or statistics DB, it may be regarded as if a street parking vehicle was detected on the road where street parking is frequent. That is, the parked vehicle information is not limited to the real-time information.

Moreover, in each of the above embodiments, the case was described in which the priority road 50 had a plurality of lanes. However, even if the priority road 50 is a single lane, it may be applied if the priority road 50 is a passing lane or a lane with a relatively large width, for example.

Moreover, for example, in the fifth embodiment described above, the case was described in which the bus stop 60 was present on the priority road 50 and the vehicle B was regarded as a parked vehicle when the vehicle B was a bus. However, it may also be applied to the case where there is a taxi stand on the priority road 50 and the vehicle B is a taxi, for example.

The invention claimed is:

1. A driving assistance device which performs driving assistance for an assisted vehicle traveling on a non-priority road and trying to merge into a priority road on the basis of the presence of a vehicle traveling on the priority road, the driving assistance device comprising:
    an assistance end position changing section which changes an end position of the driving assistance on the basis of traffic conditions on a first lane, which is nearest to the non-priority road, of lanes of the priority road;
    wherein the assistance end position changing section changes the end position on the basis of traffic conditions in which a stopped vehicle is present in the first lane or traffic conditions in which a vehicle traveling in the first lane is to stop;
    wherein the assistance end position changing section changes the end position on the basis of traffic conditions on the first lane in left and right directions when viewed from the assisted vehicle before merging.

2. The driving assistance device according to claim 1, wherein when the assisted vehicle tries to merge into the priority road to travel in the same direction as a traffic flow of the first lane, the assistance end position changing section changes the end position on the basis of the presence of a vehicle which tries to merge into the priority road from the non-priority road in order to travel in the opposite direction to the traffic flow of the first lane.

* * * * *